Dec. 2, 1941.  F. S. STICKNEY  2,264,726

POINTER STRUCTURE

Filed April 4, 1940

Insulation

WITNESSES:

INVENTOR
Fernald S. Stickney.
BY
ATTORNEY

Patented Dec. 2, 1941

2,264,726

UNITED STATES PATENT OFFICE 2,264,726

POINTER STRUCTURE

Fernald S. Stickney, West Caldwell, N. J., assignor to Westinghouse Electric & Manufacturing Company, East Pittsburgh, Pa., a corporation of Pennsylvania Application April 4, 1940, Serial No. 327,817

5 Claims. (Cl. 116—129)

The present invention relates to measuring instruments and it has particular relation to indicating pointers therefor and means for constructing such pointers. Although not limited thereto, the invention will be found of particular advantage when employed in conjunction with pointers for aircraft instruments.

Difficulty has usually been experienced in manufacturing indicating pointers for small instruments because of the difficulty in making the pointers sufficiently light as well as sufficiently strong.

This difficulty is particularly acute in the case of aircraft instruments where it often is desirable to use a pointer target considerably wider than the targets of ordinary miniature indicating instruments of comparable size. Such a large target area usually results in excessive weight and inertia, both of which are objectionable. The problem is further complicated by the requirement that the target area has a thick coating of luminous paint which increases the weight and inertia and, in addition, has a high coefficient of thermal expansion. This high coefficient of expansion, along with the fact that the luminous paint expands and contracts with changes in humidity, results in a tendency to curl the target in a manner similar to the action of a piece of bimetallic sheet. In the case of "cross pointer" instruments, it is also essential to have the target electrically insulated from the moving coil so that momentary contact of the pointers due to impact will not cause a short circuit between the two moving coils.

One type of pointer structure used for "cross pointer" instruments comprises a target made from glass tubing of oval cross section filled with luminous powder and sealed at both ends. Although this construction has some desirable features, it is impossible to provide a target of sufficient width by this means without increasing the weight and inertia to objectionable values. In addition, it has been found difficult to obtain luminous properties over the entire length of the pointer due to the necessity for attaching it securely to the cross piece. Usually the connecting joint covers up a portion of the glass tube, thereby reducing the visible luminous length.

Another previous solution consists in using a ribbed target made from sheet aluminum and cementing one end to an insulating bushing which is in turn cemented to the cross piece. In addition to lacking stiffness, this structure has a further disadvantage that it is subject to excessive bimetallic and humidity effects, such as are described above.

It is accordingly an object of the present invention to provide a novel and improved pointer structure for a measuring instrument.

Another object of the invention is to provide a pointer which combines the features of a large target area and high relative stiffness with light weight and low inertia characteristics.

A further object of the invention is to provide a pointer having a target portion made up of thin metallic tubing of semi-circular cross section.

Other objects and advantages of the invention will appear from the following detailed description in which.

Figure 1:
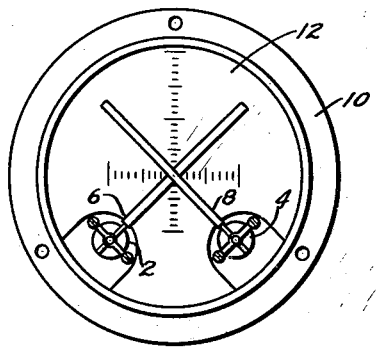
Figure 1 is a plan view of a "cross pointer" instrument employing pointers made in accordance with the invention.

Fig. 1 shows a "cross pointer" instrument having a pair of moving elements 2 and 4 to which are attached pointer structures 6 and 8, respectively. The instrument is housed in a casing 10 and provided with an indicating dial 12.

Figure 2:
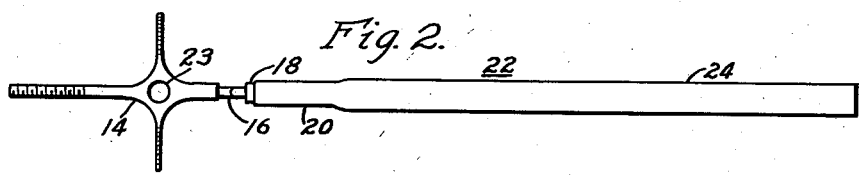
Fig. 2 is a plan view of a pointer structure embodying the invention.
Figure 3:
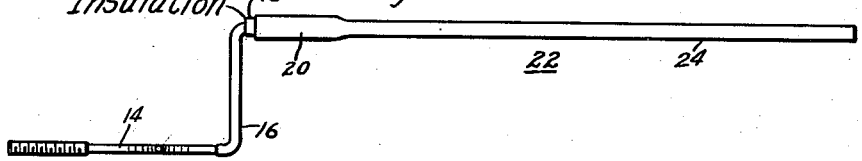
Fig. 3 is a side elevational view of the pointer structure of Fig. 2.
Figure 4:
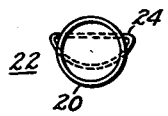
Fig. 4 is an enlarged end view of the tubular target portion of the pointer shown in Figs. 2 and 3.
Figure 5:
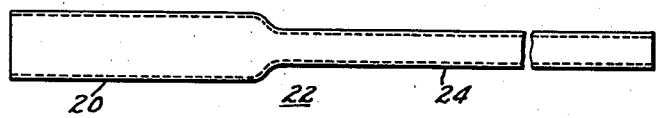
Fig. 5 is a side elevational view of the tubular member of Fig. 4.
Figure 6:
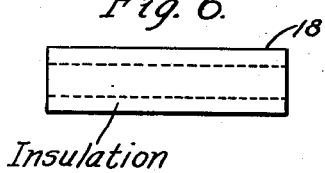
Fig. 6 is an enlarged view of the insulating bushing employed in Figs. 2 and 3.

The pointer structure, as shown in Figs. 2 and 3 includes a cross piece 14 having a supporting arm 16 which extends into an insulating bushing 18. The bushing, in turn, fits into the end 20 of a target portion 22. The balancing arms of the cross piece may be screw threaded, as shown, to receive balancing weights or nuts which are adjustable therealong. The supporting arm 16 may be formed integral with the cross piece if desired, and is provided with two right angled bends, as shown, to dispose the target portion above the indicating dial of the instrument. An aperture 23 is provided at the mid-point of the cross piece to facilitate its attachment to an instrument movement in a usual manner.

The target portion 22 is made up of a tubular member the greater portion 24 of which is approximately semi-circular in cross section. As indicated at 20, one end of this tubular member is of circular cross section to receive the insulating bushing 18 which in turn has the end of the supporting arm 16 extending into it. The tubular member 24 is preferably of a thin light weight metal such as aluminum formed from a tube of continuous substantially semi-circular cross section. The round portion 20 may then be obtained by pressing the end to this shape. The entire flat portion of the member 24 as well as the top of the rounded end portion 20 is preferably coated with a luminous paint.

A moisture resisting cement, such as butyl methacrylate may be employed for securing the cross piece bushing and target together.

From the above description, it will be evident that the present invention provides a pointer of large target area having sufficient strength without excessive thickness. Because of the thin tubing employed and the relatively small amount of paint which is necessary to make the target luminous, the pointer is light in weight and has low inertia. The stiffness of the structure permits it to resist bending due to bimetallic action of the paint or humidity changes. In addition, the target portion is properly insulated from the moving coil making it particularly useful for "cross pointer" instruments.

Since various modifications will appear to those skilled in the art, it is intended that the invention shall be limited only by the spirit and scope of the appended claims interpreted in view of the prior art.

I claim as my invention:

1. In a measuring instrument including a dial member, a pointer structure comprising a tubular member having a substantially uniform semi-circular transverse cross section over at least a portion of its length, means for securing said tubular member to said instrument for rotation over said dial member in a plane parallel to the surface comprising the straight side of the semi-circular cross section thereof, said last named surface being disposed to face away from said dial member in the direction of observation of said instrument, and luminous material disposed on said observation plane surface.

2. A pointer for a measuring instrument comprising a metallic tubular member having a target portion of substantially semi-circular transverse cross section and an end portion of substantially circular cross section, the portion of said tubular member interconnecting said target and end portions being formed to provide a gradual transition in shape therebetween, metallic attaching means including an arm for securing said tubular member to said instrument by said circular end for rotation in the plane of its flat surface, and means for electrically insulating said tubular member from said attaching means.

3. A pointer for a measuring instrument comprising a thin-walled metallic tubular member having a target portion of substantially uniform semi-circular transverse cross-section and an end of substantially circular cross section, a tubular insulating bushing fitted within said circular end of said tubular member, and a metallic attaching member including an arm extending into said bushing for securing said tubular member to said instrument for rotation in the plane of its flat surface.

4. In a measuring instrument including a movable element, a pointer structure comprising a continuous thin-walled tubular member having a target portion of substantially semi-circular transverse cross section with the straight side thereof making up a plane surface, said tubular member varying gradually in shape from an end of the target portion to attain a substantially circular transverse cross section which is maintained over a portion of the length thereof to form a cylindrical end portion for attachment to the movable element of said instrument with the plane surface of the target portion lying in its plane of movement, and a coating of luminous material disposed on the plane surface of the target portion.

5. In a measuring instrument including a movable element, a pointer member of seamless construction having a target portion of substantially uniform semi-circular transverse cross section and a substantially cylindrical end portion, said tubular member being shaped to provide a gradual transition in cross section between said target portion and said end portion with the straight side of said target portion forming a plane surface, a tubular insulating bushing fitted within the end portion of said tubular member, a metallic attaching member including an arm extending into said bushing for securing said tubular member to said movable element for movement parallel to the plane surface of its target portion, and a coating of luminous material disposed on the plane surface of the target portion.

FERNALD S. STICKNEY.